United States Patent [19]

Matsuda et al.

[11] Patent Number: 4,602,261

[45] Date of Patent: Jul. 22, 1986

[54] INK JET ELECTRODE CONFIGURATION

[75] Inventors: Hiroto Matsuda, Ebina; Makoto Shibata, Hiratsuka; Masami Ikeda, Machida; Hiroto Takahashi, Hiratsuka, all of Japan

[73] Assignee: Canon Kabushiki Kaisha, Tokyo, Japan

[21] Appl. No.: 597,935

[22] Filed: Apr. 9, 1984

[30] Foreign Application Priority Data

Apr. 19, 1983 [JP] Japan .................................. 58-67722

[51] Int. Cl.4 ............................................ G01D 15/18

[52] U.S. Cl. ............................................ 346/140 R

[58] Field of Search .................................... 346/140 R

[56] References Cited

U.S. PATENT DOCUMENTS 4,336,548 6/1982 Matsumoto ..................... 346/140 R 4,438,191 3/1984 Cloutier et al. ..................... 430/324

*Primary Examiner*—E. A. Goldberg

*Assistant Examiner*—Gerald E. Preston

*Attorney, Agent, or Firm*—Fitzpatrick, Cella, Harper & Scinto

[57] ABSTRACT

A liquid jet recording head is provided with a liquid discharging portion having an orifice for discharging liquid and forming flying liquid droplets, and a liquid flow path communicating with the orifice and having as a part of the construction thereof a heat-acting portion in which heat energy generated in a heat-generating portion for forming the liquid droplets acts on the liquid, and an electro-thermal converting element electrically connected to a heat-generating resistive material layer provided on a base plate, the electro-thermal converting element having at least a pair of opposed electrode wiring portions provided on the heat-generating resistance material layer, the heat-generating portion being formed between the electrode wiring portions. The width of the heat-generating resistive material layer in at least the part of the heat-generating resistive material layer in the area in which the electrode wiring portions are layered is greater than the width of the electrode wiring portions.

14 Claims, 6 Drawing Figures

INK JET ELECTRODE CONFIGURATION

BACKGROUND OF THE INVENTION

1. Field of the Invention

This invention relates to a liquid jet recording head which injects liquid and forms flying liquid droplets, thereby accomplishing recording.

2. Description of the Prior Art

Ink jet recording methods (liquid jet recording methods) have recently drawn attention in that noise occurring during recording is negligible, high-speed recording is possible and recording can be accomplished without requiring the special process of fixing images on so-called plain paper.

Among such liquid jet recording methods are those disclosed, for example, in Japanese Laid-open Patent Application No. 51837/1979 and German Laid-open Patent Application (DOLS) No. 2843064, which have characteristics different from those of other liquid jet recording methods in that heat energy is caused to act on liquid to thereby obtain a driving force for liquid droplet discharge.

That is, the recording methods disclosed in the above-mentioned publications are characterized in that the liquid subjected to the action of the heat energy undergoes a state change which may result in a sharp increase in volume and by the action force resulting from this state change, liquid is discharged from an orifice at the end of the recording head portion, whereby flying liquid droplets are formed and these liquid droplets adhere to the recording medium and recording is accomplished.

The liquid jet recording method disclosed in DOLS No. 2843064 is not only very effectively applicable to the so-called drop-on demand recording method, but also readily permits the recording head portion to be of the full line type and have closely spaced, multiple orifices and therefore provides images of a high degree of resolution and high quality at a high speed.

The recording head portion of the apparatus applied to the above-described recording method is provided with a liquid discharging portion having an orifice provided to discharge and a liguid flow path communicating with the orifice and having as a part of the construction thereof a heat-acting portion in which heat energy for discharging liquid droplets acts on the liquid, and an electro-thermal converting element as means for generating heat energy.

This electro-thermal converting element is provided with a pair of electrodes and a heat-generating resistive layer connected to these electrodes and having a heat-generating area (a heat-generating portion) between these electrodes, and generally has in the upper portion thereof a protection layer covering the electrodes and the surface of the heat-generating portion and is formed on an insulative base plate. Schematic views for illustrating a typical example of the prior art are shown in FIGS. 1(*a*) and 1(*b*) of the accompanying drawings. FIG. 1(*a*) is a fragmentary plan view of the electro-thermal converting element as seen from above, except for the protection layer covering the surface thereof, and FIG. 1(*b*) is a cross-sectional view of the electro-thermal converting element taken along dot-and-dash line AA' of FIG. 1(*a*).

As shown in FIG. 1(*b*), the electrothermal converting element is of a structure in which a heat-generating resistive material layer 1, an electrode conductor layer 2 and a protection layer 3 are layered on an insulating base plate 4 in the named order from the base plate side, and of these layers, the heat-generating resistive material layer 1 and the electrode conductor layer 2 are patterned in predetermined shapes so as to form a heat-generating portion designated by 103 in FIG. 1(*a*) and electrode wiring portions 101 and 102 for supplying power to cause heat to be generated in the heat-generating portion 103.

In the fragmentary plan view of FIG. 1(*a*), only one heat-generating portion is shown for explanation, but the actual electro-thermal converting element is generally of a structure in which a plurality of heat-generating portions are arranged at predetermined intervals.

Now, formation of the heat-generating portion 103 and the electrode wiring portions 101 and 102 is generally effected by the following process. The heat-generating resistive material layer 1 is first formed on the surface of the base plate 4 as by deposition or sputtering, and the electrode conductor layer 2 is further formed on the upper surface thereof by a similar method. Then, by the so-called photoetching method, a part of the electrode conductor layer 2 and a part of the heat-generating resistive material layer 1 are successively removed in accordance with a predetermined pattern, whereby electrode wiring portions 101, 102 and heat-generating portion 103 of desired shapes are formed at desired positions.

During photoetching, etching has heretofore been carried out so that the width of the heat-generating resistive material layer 1 which provides the lower portion of the electrode wiring portions 101 and 102 is equal to the width of the electrode wiring portions 101 and 102. That is, to form the shape of the electrode wiring portions 101 and 102 by the photoetching method, a photo-resist pattern is formed into the desired shape of the electrode wiring portions 101 and 102 on the upper surface of the electrode conductor layer 2, whereafter the unnecessary electrode conductor layer 2 on which the resist pattern is not formed is removed by etching, and then the heat-generating resistive material layer 1 is removed by etching, but in this case, when the heat-generating resistive material layer 1 in the lower portion of the electrode wiring portions 101 and 102 is etched, the relatively thick electrode conductor layer 2 is present in the lower portion of the photoresist and therefore, the heat-generating resistive material layer 1 is readily attached from the side thereof by the etching liquid during the etching of the electrode conductor layer 2 and, as shown in FIG. 1(*b*), the width of the heat-generating resistive material layer 1 in this portion tends to be narrower than the width of the electrode wiring portions 101 and 102 above it. However, if, in the electrode wiring portions 101 and 102, the edge of the heat-generating resistive material layer 1 which is the lower layer lies inside the edge of the electrode conductor layer which is the upper layer, "curling" or "breakage" will be readily created in the edge of the electrode conductor layer 2.

In the manufacture of the electro-thermal converting element, it is generally known to form the protection layer 3 so as to cover the electrode wiring portions 101 and 102 and, in this case, the side edge portion of the electrode conductor layer 2 juts out with respect to the heat-generating resistive material layer 1 which is the lower layer. Therefore, the coating property of the protection layer 3 for the side edge portion is very poor, and sometimes liquid has entered the electrode wiring portions through the protection layer 3 and has been diffused along the edges of the electrode wiring portions 101 and 102 to moisten the electrode conductor layer 2 and even melt it. Particularly, where the edge portion of the electrode conductor layer 2 is curled as previously described, the coating property of the protection layer 3 becomes poorer and this has led to the readiness with which breakage of the electrode wiring occurs.

SUMMARY OF THE INVENTION

The present invention has been made in view of the above-noted points and a primary object thereof is to provide a liquid jet recording head which is excellent in durability in frequently repeated use or continuous long-time use of the recording head and capable of maintaining the initial good liquid droplet formation characteristic stably for a long period of time.

It is another object of the present invention to provide a liquid injection recording heat which is high in reliability of manufacture and working.

It is still another object of the present invention to provide a liquid jet recording head which is high in manufacturing yield even when the recording head is made with multiple orifices.

It is also an object of the present invention to provide a liquid jet recording head which is provided with a liquid discharging portion having an orifice for discharging liquid and forming flying liquid droplets, and a liquid flow path communicating with the orifice and having as a part of the construction thereof a heat-acting portion in which heat energy generated in a heat-generating portion for forming the liquid droplets acts on the liquid, and an electro-thermal converting element electrically connected to a heat-generating resistive material layer provided on a base plate, the electro-thermal converting element having at least a pair of opposed electrode wiring portions provided on the heat-generating resistive material layer, the heat-generating portion being formed between the electrode wiring portions, and wherein the width of the heat-generating resistive material layer and of at least a part of the heat-generating resistive material layer in the area thereof in which the electrode wiring portions are layered is greater than the width of the electrode wiring portions.

It is still another object of the present invention to provide a liquid jet recording head having an orifice provided to form flying liquid droplets and an electro-thermal converting element having a pair of electrodes opposed to each other at a desired interval and connected to a heat-generating resistive material layer for generating energy for discharging the liquid droplets, the interval providing a heat-generating portion, and wherein at least a part of the width of the heat-generating resistance material layer is greater than the width of the electrodes.

The invention will become fully apparent from the following detailed description thereof taken in conjunction with the accompanying drawings.

DESCRIPTION OF THE PREFERRED EMBODIMENTS

The present invention will hereinafter be described specifically by reference to the drawings.

Figure 2A:
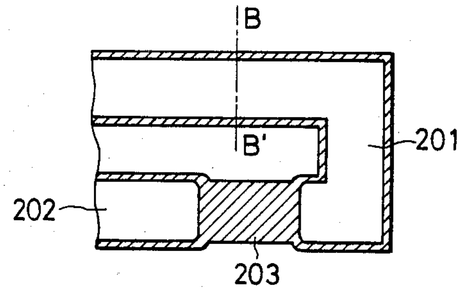
FIGS. 2(*a*) and 2(*b*) illustrate the essential portions of the structure of an embodiment of the recording head of the present invention, FIG. 2(*a*) being a fragmentary plan view of an electro-thermal converting element as seen from above, except for a protection layer covering the surface thereof, and FIG. 2(*b*) being a cross-sectional view of the electro-thermal converting element taken along dot-and-dash line BB′ of FIG. 2(*a*).
Figure 2B:
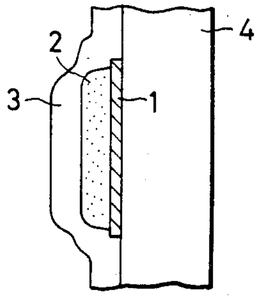

FIG. 2(*a*) shows a fragmentary plan view of an electro-thermal converting element as seen from above, except for a protection layer covering the surface thereof to illustrate the essential portions of the structure of a preferred embodiment of the liquid jet recording head of the present invention, and FIG. 2(*b*) shows a cross-sectional view of the electro-thermal converting element taken along dot-and-dash line BB′ of FIG. 2A.

Figure 1A:
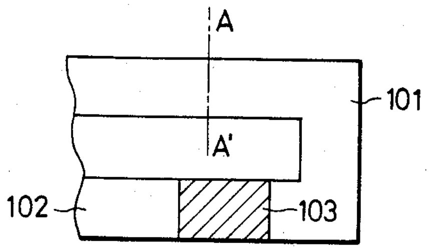
FIGS. 1(*a*) and 1(*b*) illustrate the essential portions of the structure of a typical recording head according to the prior art, FIG. 1(*a*) being a fragmentary plan view of an electro-thermal converting element as seen from above, except for a protection layer covering the surface thereof, and FIG. 1(*b*) being a cross-sectional view of the electro-thermal converting element taken along dot-and-dash line AA′ of FIG. 1(*a*).
Figure 1B:
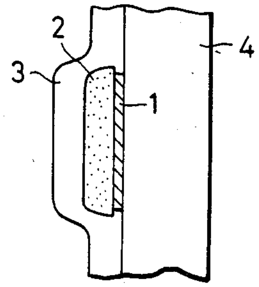

In FIG. 2, as in FIG. 1, the liquid flow path and the orifice member are not shown and only one heat-generating portion is shown for explanation, but the actual electro-thermal converting element is usually of a structure in which a plurality of heat-generating portions are arranged at predetermined intervals.

In FIG. 2(*a*), reference numeral 203 designates a heat-generating portion and reference numerals 201 and 202 denote electrode wiring portions for supplying power to the heat-generating portion 203, the electrode wiring portions 201 and 202 being opposed to each other at a predetermined interval. In FIG. 2(*b*), reference numeral 1 designates a heat-generating resistive material layer forming the lower layer of the electrode wiring portion 201 (which heat-generating resistive material layer is formed integrally with the heat-generating resistive material layer in the heat-generating portion), reference numeral 2 denotes an electrode conductor layer forming the electrode wiring portion 201, reference numeral 3 designates a protection layer for shielding the electrode conductor layer 2 and the heat-generating resistive layer 1 from ink, and reference numeral 4 denotes a base plate. FIG. 2(*b*) shows a cross-section of the portion including the electrode wiring portion 201, and the cross-section of the portion including the electrode wiring portion 202 is also of the same structure.

Now, as shown in FIGS. 2(*a*) and 2(*b*), in the recording head of the present invention, the horizontal width of the base plate surface of the heat-generating resistance material layer 1 corresponding to the lower portions of the electrode wiring portions 201 and 202 is greater than the width of the electrode conductor layer 2. At the edge portion of the electrode wiring portions 201 and 202, the protection layer 3 is formed so as to cover two steps, i.e., the step between the heat-generating resistive material layer 1 and the base plate 4 and the step between the electrode conductor layer 2 and the heat-generating resistance material layer 1.

The ratio of the width of the electrode wiring portions 201 and 202 to the width of the heat-generating resistive material layer 1 underlying the electrode wiring portions 201 and 202 is not specifically restricted, but the width from the edge of the pattern of the heat-generating resistive material layer 1 to the edge of the pattern of the electrode conductor layer 2 may be secured to such a degree that there is a sufficient margin to control the etching even if more or less great overetching is created in the heat-generating resistive material layer 1. Preferably, the width of the pattern of the heat-generating resistive material layer 1 should be made greater than the width of the pattern of the electrode conductor layer 2 by 1 μm or more, and more preferably by 2 μm or more.

The liquid jet recording head of the present invention is completed by forming liquid flow paths 204 corresponding to the heat-generating portions 203 and orifices 205 on the base plate formed as described above.

Figure 3:
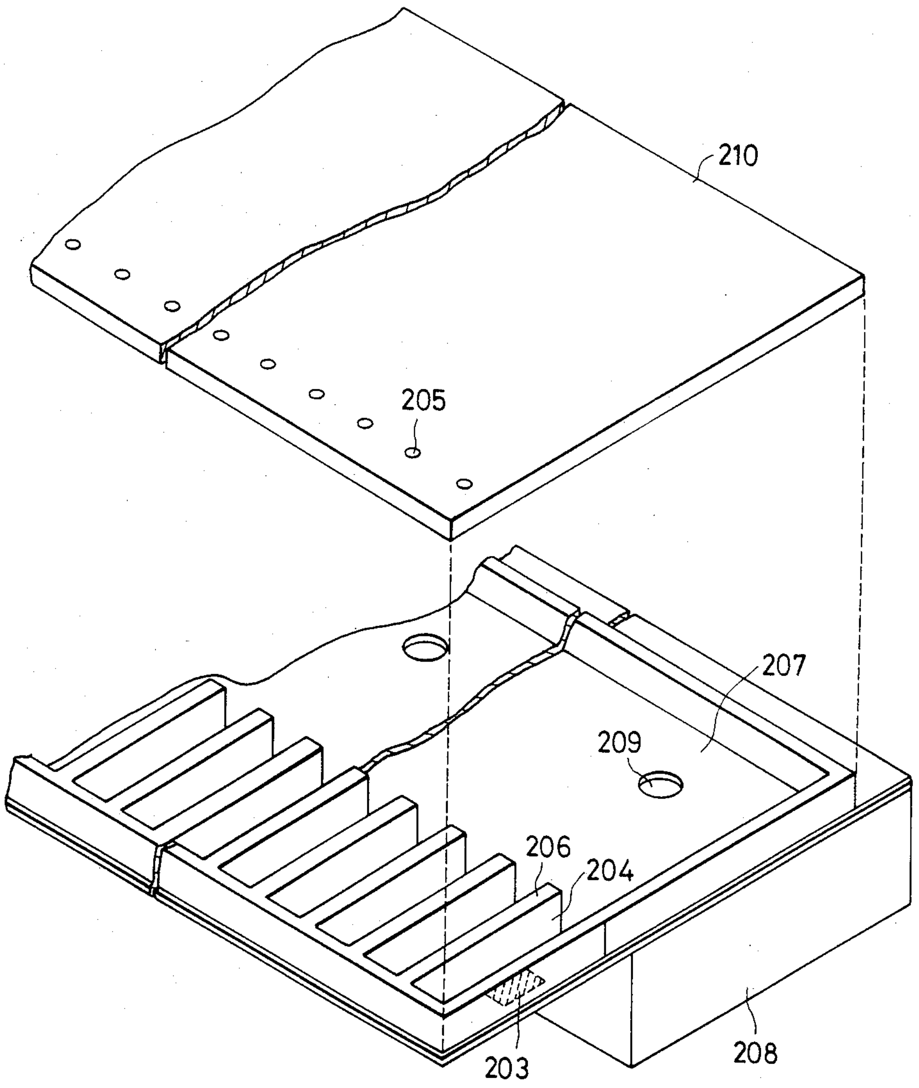
FIG. 3 is a schematic exploded view for showing the internal structure of an embodiment of the liquid jet recording head of the present invention.

FIG. 3 is a schematic exploded view for showing the internal structure of an embodiment of the thus completed liquid jet recording head. In this embodiment, the orifices 205 are provided above the heat-generating portions 203 (only one of which is shown). Reference numeral 206 designates ink flow path walls, reference numeral 207 denotes a common liquid chamber, reference numeral 208 designates a second common liquid chamber, reference numeral 209 denotes through-holes connecting the common liquid chamber 207 to the second common liquid chamber 208, and reference numeral 210 designates a ceiling plate. The wiring portion of the electro-thermal converting element is not shown in FIG. 3.

Figure 4:
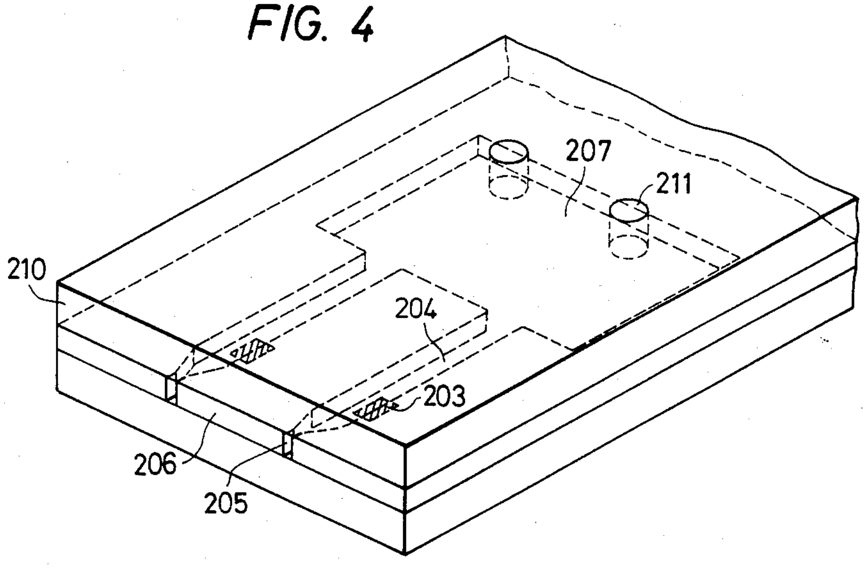
FIG. 4 is a schematic view for showing the internal structure of another embodiment of the liquid jet recording head of the present invention.

FIG. 4 shows a schematic perspective view of another embodiment of the completed liquid jet recording head. In this embodiment, orifices 205 are formed at the ends of liquid flow paths. Designated by 211 are ink supply ports.

In the present invention, materials used or proposed in this field of art may be widely used as the materials of the heat-generating resistive material layer 1, the electrode conductor layer 2, the protection layer 3 and the base plate 4.

As described above, in the recording head according to the present invention, the coverage of the protection layer is formed very well in the electrode wiring portion and the heat-generating resistive material layer and therefore, even if the recording head is used repetitively or continuously for a long time, the breaking of wire due to the melting of the electrode wiring portion does not occur and the initial good liquid droplet formation characteristic can be maintained stably for a long period of time.

Also, in the manufacturing process of the recording head, the working particularly in the step of forming the electrode wiring portion becomes easy and a liquid jet recording head of high reliability can be provided at a very high yeild.

A typical example of the recording head according to the present invention will hereinafter be shown and the present invention will be described specifically with respect to the successive manufacturing steps.

EXAMPLE

A heat-generating resistive material layer 1 consisting of $HfB_2$ was formed to a thickness of 2000 Å on the surface of a Si wafer by sputtering, and subsequently aluminum was accumulated to a thickness of 1 μm on the upper surface of the heat-generating resistive material layer 1 by an electric beam deposition method to form an electrode conductor layer 2. Then, photoresist was applied onto the electrode conductor layer 2 to form a photo-resist pattern in the form of the electrode wiring portions 201 and 202, and the unnecessary portion of the electrode conductor layer 1 was removed by the use of etching liquid comprising a mixture of $HNO_3$, $CH_3COOH$ and $H_3PO_4$, whereafter the photo-resist was stripped off. The width of the electrode conductor layer 2 perpendicular to the lengthwise direction thereof was 80 μm, and the spacing between the opposed electrode wiring portions 201 and 202 in the heat-generating portion 203 was formed to 200 μm.

Subsequently, the pattern of the heat-generating resistive material layer 1 below the electrode wiring conductor layer 2 of the electrode wiring portions 201 and 202 was formed again by the photolithograph method. Then, the unnecessary, portion of the heat-generating resistive material layer was removed by a mixture of HF and $HNO_3$. The width of the heat-generating resistance material layer 1 was formed to 86 μm. Since the width of the resist pattern of the heat-generating resistive material layer 1 is greater than the width of the pattern of the electrode conductor layer 2, the resist is formed in intimate contact with the heat-generating resistance material layer 1 in the edge portion and, as compared with the convention method in which resist is formed on the upper surface of the electrode conductor layer 2, the degree of the overetching could be minimized. Even if more or less great overetching is created, there is a sufficient margin to control the etching between the edge of the pattern of the heat-generating resistive material layer 1 to the edge of the pattern of the electrode conductor layer 2 and therefore, there does not occur the inconvenience that the etching of the heat-generating resistive material layer progresses to the inside of the edge of the electrode conductor layer 2. Also, as will be seen from what has been described above, there is no inconvenience even if more or less deviation occurs to the mask alignment between the patterns of the electrode conductor layer 2 and the heat-generating resistive material layer 1.

Finally, a layer of $SiO_2$ as the protection layer 3 for at least the portions of the electrode wiring portions 201 and 202 and the heat-generating portion 203 to be in contact with the liquid was accumulated to a thickness of 2.2 μm by sputtering. The step coverage of this protection layer of $SiO_2$ was formed very well similarly to the other step portion because the step portion between the base plate 4 and the heat-generating resistive material layer 1 and the step portion between the heat-generating resistive material layer 1 and the electrode conductor layer 2 were spaced from each other. The previously described liquid jet recording head was assembled by the use of the thus formed base plate.

In this liquid jet recording head, the protection layer is formed very well as described above and therefore, there did not occur the inconvenience that as in the conventional recording head, when boiling of the liquid was repeated by the heat-generating portion, the liquid entered from the unsatisfactory coverage portion of the protection layer along the side edges of the electrode wiring portions 201 and 202 and melted the electrode wiring conductor layer.

We claim:

1. A liquid jet recording head comprising:

a liquid discharging portion having an orifice for discharging liquid as flying liquid droplets and a liquid flow area communicating with said orifice; and an electro-thermal converting element including a heat-generating resistive layer electrically connected to an electrode to form in said liquid flow area heat generating means having a predetermined width for generating energy in liquid in said liquid flow area for discharging the flying liquid droplets, said electrode including an electrode layer overlying said heat generating resistive layer and having a terminal end at said heat-generating means, wherein the width of said heat-generating resistive layer immediately underlying said electrode layer at said terminal end thereof is greater than said predetermined width and greater than the width of said electrode layer at said terminal end thereof.

2. A liquid jet recording head according to claim 1, wherein the distance from the edge of said heat-generating resistive layer to the edge of said overlying electrode layer is about 1 μm.

3. A liquid jet recording head according to claim 1, wherein said orifice is provided at the end of said liquid flow area.

4. A liquid jet recording head according to claim 1, wherein said orifice is opposed to said heat-generating means.

5. A liquid jet recording head according to claim 1, wherein a protection layer is provided on said electro-thermal converting element.

6. A liquid jet recording head according to claim 1, wherein a plurality of said liquid flow areas are provided.

7. A liquid jet recording head comprising:

an orifice for discharging liquid as flying liquid droplets; and an electro-thermal converting element having an electrode electrically connected to a heat-generating resistive layer to form heat-generating means having a predetermined width for generating energy for discharging the flying liquid droplets, said electrode including an electrode layer overlying said heat-generating resistive layer and having a terminal end at said heat-generating means, wherein the width of said heat-generating resistive layer immediately underlying said electrode layer at said terminal end thereof is greater than said predetermined width and greater than the width of said electrode layer at said terminal end thereof.

8. A liquid jet recording head according to claim 7, wherein the distance from the edge of said heat-generating resistive layer to the edge of said overlying electrode layer is about 1 μm.

9. A liquid jet recording head according to claim 7, wherein said orifice is opposed to said heat-generating means.

10. A liquid jet recording head according to claim 7, wherein a protection layer is provided on said electro-thermal converting element.

11. A liquid jet recording head according to claim 7, wherein a plurality of said orifices are provided.

12. A liquid jet recording head according to claim 7, wherein said orifice is disposed substantially perpendicular to the plane of said heat-generating means.

13. A liquid jet recording head according to claim 1, wherein:

said electro-thermal converting element includes another electrode layer overlying said heat-generating resistive layer and having a terminal end spaced from and facing said terminal end of said first-mentioned electrode layer with said heat-generating means therebetween;

the width of said electrode layers is substantially uniform for a predetermined distance from said terminal ends thereof; and the width of said heat-generating resistive layer between said terminal ends of said electrode layers is substantially the same as said width of said electrode layers.

14. A liquid jet recording head according to claim 7, wherein:

said electro-thermal converting element includes another electrode layer overlying said heat-generating resistive layer and having a terminal end spaced from and facing said terminal end of said first-mentioned electrode layer with said heat-generating means therebetween; resistive layer and having a terminal and spaced from and facing said terminal end of said first-mentioned electrode layer with said heat-generating means therebetween;

the width of said electrode layers is substantially uniform for a predetermined distance from said terminal ends thereof; and the width of said heat-generating resistive layer between said terminal ends of said electrode layers is substantially the same as said width of said electrode layers.

* * * * *

UNITED STATES PATENT AND TRADEMARK OFFICE

CERTIFICATE OF CORRECTION

PATENT NO. : 4,602,261

DATED : July 22, 1986

INVENTOR(S) : HIROTO MATSUDA ET AL.

It is certified that error appears in the above-identified patent and that said Letters Patent is hereby corrected as shown below:

Column 1, line 44, change "discharge and a liguid" to --discharge liquid and a liquid--.

Column 2, line 49, change "attached" to --attacked--.

Column 3, line 21, change "heat" to --head--.

Column 6, line 21, change "unnecessary, portion" to --unnecessary portion--.

Column 8, line 40, delete "resistive layer and having a";
line 41, delete the line;
line 42, delete the line; and
line 43, delete the line.

Signed and Sealed this

Tenth Day of February, 1987

*Attest:*

DONALD J. QUIGG

*Attesting Officer*

*Commissioner of Patents and Trademarks*